United States Patent
Cudak et al.

(10) Patent No.: US 7,165,204 B2
(45) Date of Patent: Jan. 16, 2007

(54) MULTI-MODE HYBRID ARQ SCHEME

(75) Inventors: Mark C. Cudak, Rolling Meadows, IL (US); Brian K. Classon, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 93 days.

(21) Appl. No.: 10/989,177

(22) Filed: Nov. 15, 2004

(65) Prior Publication Data

US 2006/0123324 A1   Jun. 8, 2006

(51) Int. Cl.
*H03M 13/00* (2006.01)

(52) U.S. Cl. .................. 714/751; 714/774; 714/794

(58) Field of Classification Search ............... 714/751, 714/752, 774, 784, 786, 794, 744, 748
See application file for complete search history.

(56) References Cited

U.S. PATENT DOCUMENTS

| | | | |
|---|---|---|---|
| 6,308,294 B1 * | 10/2001 | Ghosh et al. ............... 714/751 |
| 6,697,784 B1 * | 2/2004 | Bacon et al. ............... 705/9 |
| 6,697,986 B1 * | 2/2004 | Kim et al. ............... 714/751 |
| 6,697,988 B1 * | 2/2004 | Kim et al. ............... 714/752 |
| 6,700,867 B1 * | 3/2004 | Classon et al. ............ 370/216 |
| 6,738,370 B1 * | 5/2004 | Östman ....................... 370/349 |
| 6,987,780 B1 * | 1/2006 | Wei et al. ............... 370/469 |
| 2003/0016698 A1 * | 1/2003 | Chang et al. ............... 370/469 |

* cited by examiner

*Primary Examiner*—Guy Lamarre
*Assistant Examiner*—Fritz Alphonse (57) ABSTRACT

A method and apparatus for performing H-ARQ transmission is described herein. Bits received on a first transmission are stored and combined with the bits received on later transmissions thereby increasing the likelihood of a correct decoding on later transmissions. Additionally, a plurality of coding schemes (e.g., Convolutional Codes, Block Turbo Codes, Convolutional Turbo Codes, Low Density Party Check Codes, . . . , etc.) are utilized, with an information element being reserved to signal what form of H-ARQ is being utilized.

10 Claims, 5 Drawing Sheets

MULTI-MODE HYBRID ARQ SCHEME

CROSS REFERENCE TO RELATED APPLICATIONS

This application is related to U.S. patent application Ser. No. 10/988,897 filed Nov. 15, 2004 titled "Multi-Mode Hybrid ARQ Scheme".

FIELD OF THE INVENTION

The present invention relates generally to systems that employ hybrid ARQ schemes and in particular, to a multi-mode hybrid ARQ scheme.

BACKGROUND OF THE INVENTION

Digital data transmissions over wired and wireless links sometimes may be corrupted, for instance, by noise in the link or channel, by interference from other transmissions, or by other environmental factors. Even with clear communication channels, which lend themselves to high data rates, it may not be possible to appropriately decode the data stream with the requisite error rates. In order to solve this problem, many current communication systems employ an automatic repeat request (ARQ) scheme for retransmission. In such systems an opportunity exists for requesting that data be retransmitted upon detection of an error. In more complex systems a hybrid ARQ scheme is employed.

In systems employing a hybrid ARQ (H-ARQ) scheme, a receiver combines previously received erroneous transmissions of a packet of information with a newly received transmission in an effort to successfully ascertain the true contents of the packet. In other words, coded bits received on a first erroneous transmission are stored and combined with the coded bits received on later transmissions thereby increasing the likelihood of a correct decoding on later transmissions. Similarly the coded bits received on the second or later transmissions are stored for combining with subsequent received bits.

As one of ordinary skill in the art will recognize, the form of H-ARQ utilized by any communication system is directly dependent upon the type of coding mode utilized. For example, a system employing multiple types of forward error correction (FEC) modes, like Convolutional Codes (CC), Block Turbo Codes (BTC), Convolutional Turbo Codes (CTC) and Low Density Party Check Codes (LDPC), must identify which FEC mode is being utilized in conjunction with the H-ARQ. Moreover, many parameters like the information block size, resource allocation size and incremental redundancy version will be dependent on the FEC mode. With next-generation communication systems employing multiple coding modes, it is impossible to utilize a single H-ARQ signaling scheme and cover all available FEC modes. Therefore a need exists for a method and apparatus to a multi-mode hybrid ARQ within a communication system employing several coding modes.

DETAILED DESCRIPTION OF THE DRAWINGS

To address the above-mentioned need a method and apparatus for performing H-ARQ transmission is described herein. Bits received on a first transmission are stored and combined with the bits received on later transmissions thereby increasing the likelihood of a correct decoding on later transmissions. Additionally, a plurality of coding schemes (e.g., Convolutional Codes, Block Turbo Codes, Convolutional Turbo Codes, Low Density Party Check Codes, . . . , etc.) are utilized, with an information element being reserved to signal what form of H-ARQ is being utilized.

The present invention encompasses a method for performing hybrid automatic repeat request (H-ARQ). The method comprises the steps of determining an H-ARQ mode being utilized based on a type of encoding, transmitting a message to a receiver indicating the H-ARQ mode being utilized, and transmitting an H-ARQ packet using the H-ARQ mode.

The present invention additionally encompasses a method for performing hybrid automatic repeat request (H-ARQ). The method comprises the steps of determining an H-ARQ mode being utilized based on a type of encoding, transmitting a message to a receiver indicating the H-ARQ mode being utilized, and communicating with a mobile unit by sending and/or receiving H-ARQ packets using the H-ARQ mode.

The present invention additionally encompasses a method for performing H-ARQ. The method comprises the steps of receiving an over-the air message from a transmitter performing H-ARQ, the over-the-air message comprising an H-ARQ mode, and performing a type of H-ARQ based on the message.

The present invention additionally encompasses an apparatus comprising an encoder encoding data, logic circuitry determining a type of H-ARQ based on a type of encoding being used by the encoder, and a transmitter transmitting a message over the air to a receiver indicating the type of H-ARQ.

The present invention additionally encompasses an apparatus comprising a receiver receiving an over-the-air message comprising an H-ARQ mode and a decoder performing a type of H-ARQ based on the message.

Figure 1:
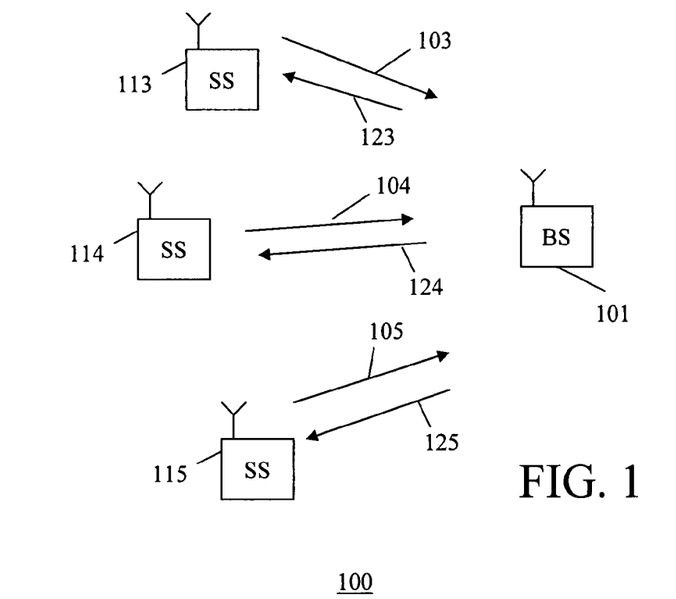
FIG. 1 is a block diagram of a communication system in accordance with the preferred embodiment of the present invention.

Turning now to the drawings, wherein like numerals designate like components, FIG. 1 is a block diagram of communication system 100 in accordance with the preferred embodiment of the present invention. In the preferred embodiment of the present invention, communication system 100 utilizes an IEEE 802.16 communication system protocol, but in alternate embodiments communication system 100 may utilize other communication system protocols such as, but not limited to, the Wireless LAN standards such as 802.11b, the next generation Global System for Mobile Communications (GSM) protocol, a next generation CDMA architecture as described in the cdma2000 International Telecommunication Union-Radio communication (ITU-R) Radio Transmission Technology (RTT) Candidate Submission document, or the CDMA system protocol as described in "Personal Station-Base Station Compatibility Requirements for 1.8 to 2.0 GHz Code Division Multiple Access (CDMA) Personal Communication Systems" (American National Standards Institute (ANSI) J-STD-008).

Communication system 100 includes at least one Base Station (BS) 101, and multiple subscriber stations (SSs) 113–115. Although not shown, communication system 100 additionally includes well known network elements such as Gatekeepers (GKs) and GateWays (GWs). It is contemplated that network elements within communication system 100 are configured in well known manners with processors, memories, instruction sets, and the like, which function in any suitable manner to perform the function set forth herein.

As shown, subscriber stations 113–115 are communicating with BS 101 via uplink communication signals 103–105, respectively, while BS 101 is communicating with subscriber stations 113–115 via downlink communication signals 123–125, respectively. As discussed above, digital data transmissions over wired and wireless links sometimes may be corrupted, for instance, by noise in the link or channel, by interference from other transmissions, or by other environmental factors. In order to help correct corrupted transmissions, communication system 100 may employ a plurality of FEC coding modes and H-ARQ retransmission schemes, one H-ARQ retransmission scheme for each coding scheme utilized. In other words, bits received on a first transmission are stored and combined with the bits received on later transmissions thereby increasing the likelihood of a correct decoding on later transmissions. Similarly the bits received on the second or later transmissions are stored for combining with subsequent received bits.

Communication system 100 supports two main variants of H-ARQ, particularly, generic Chase Combining or Incremental Redundancy (IR). The H-ARQ variants may be applied to a variety of different Forward Error Correction (FEC) modes such as Convolutional Codes (CC), Block Turbo Codes (BTC), Convolutional Turbo Codes (CTC) and Low Density Parity Check Codes (LDPC). However, in alternate embodiments of the present invention, other forms of FEC schemes may be utilized.

For IR, the PHY layer will generate two or more different versions of encoded blocks for a particular information block. In some cases, the encoded blocks may be referred to as sub-packets. Each version of encoded block must be identified either implicitly or explicitly in the H-ARQ signaling scheme. For example, a sub-packet may be uniquely identified using a sub-packet identifier (SPID). For Chase combining, the PHY layer will encode the H-ARQ packet generating only one version of the encoded packet. As a result, no SPID is required for Chase combining.

In the preferred embodiment of the present invention, system 100 identifies the specific H-ARQ scheme utilized by the transmitter (whether subscriber stations 113–115 or base station 101) based on a type of encoding. Since the 802.16 system protocol defines Information Elements (IEs) to inform the subscriber stations of necessary system information, in the preferred embodiment of the present invention an IE is provided (Switch-Mode IE) that informs subscriber stations 113–115 of the form of H-ARQ utilized by base station 101. This is illustrated in FIG. 2.

Figure 2:
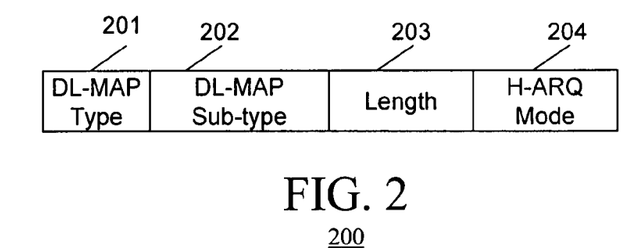
FIG. 2 is a block diagram of a switch-mode IE message.

FIG. 2 along with table 1 illustrates an IEEE 802.16 switch-mode information element (IE) containing the H-ARQ mode.

TABLE 1

Switch-Mode IE

| Syntax | Size | Notes |
| --- | --- | --- |
| Compact_DL-MAP_IE ( ) { | | |
|   DL-MAP Type =7 | 3 bits | |
|   DL-MAP sub-type | 5 bits | Extension sub type |
|   Length | 4 bits | Length of the IE in Bytes |
|   H-ARQ mode | 4 bits | Sub-type dependent payload |

As shown, Switch-Mode IE message 200 comprises DL-MAP Type 201, DL-MAP Sub-Type 202, Length 203, and H-ARQ Mode 204. The fields of the Switch-Mode IE message 200 are defined as follows:

DL-MAP Type: This value specifies the type of the compact DL-MAP IE. A value of 7 indicates the extension type. In 802.16, DL-MAP type equal 7 identifies this message as being a part of the extended DL-MAP message format. The extended format allows 32 E types to be added to the protocol beyond the 8 IE types defined in the basic DL-MAP format. In the extended DL-MAP message format, the DL-MAP type is always followed by a 5-bit DL-MAP sub-type field identify which of the 32 extended formats is contained within this message.

DL-MAP Sub-Type: This value specifies the extended map type as H-ARQ mode switch.

Length: This indicates the length of this IE in Bytes. The length field allows legacy subscribers to skip over IEs that they do not understand in the list of IEs contained in a DL-MAP message. The H-ARQ switch-mode is encoded as 2 since the contents of the message is exactly 2 bytes.

H-ARQ mode: This is a 4-bit value specifies the H-ARQ mode for all subsequent Compact DL-MAP IEs to the end of the current H-ARQ map. In many byte oriented protocols such as employed by the 802.16 DL-MAP message all IEs must be an integer multiple of bytes. Therefore a 4-bit value is used to achieve an exact length of two bytes given the required DL-MAP type of 3 bits, DL-MAP sub-type of 5 bits and length field 4 bits. Smaller or larger fields could be substituted for other protocols provided that an adequate number of code points are available to signal the types of FEC modes. The H-ARQ mode being utilized is determined by the FEC coding modes and H-ARQ retransmission schemes the receiver supports. For example, generic Chase may be used in conjunction with the CC, CTC, BTC, or LDPC coding modes.

Figure 3:
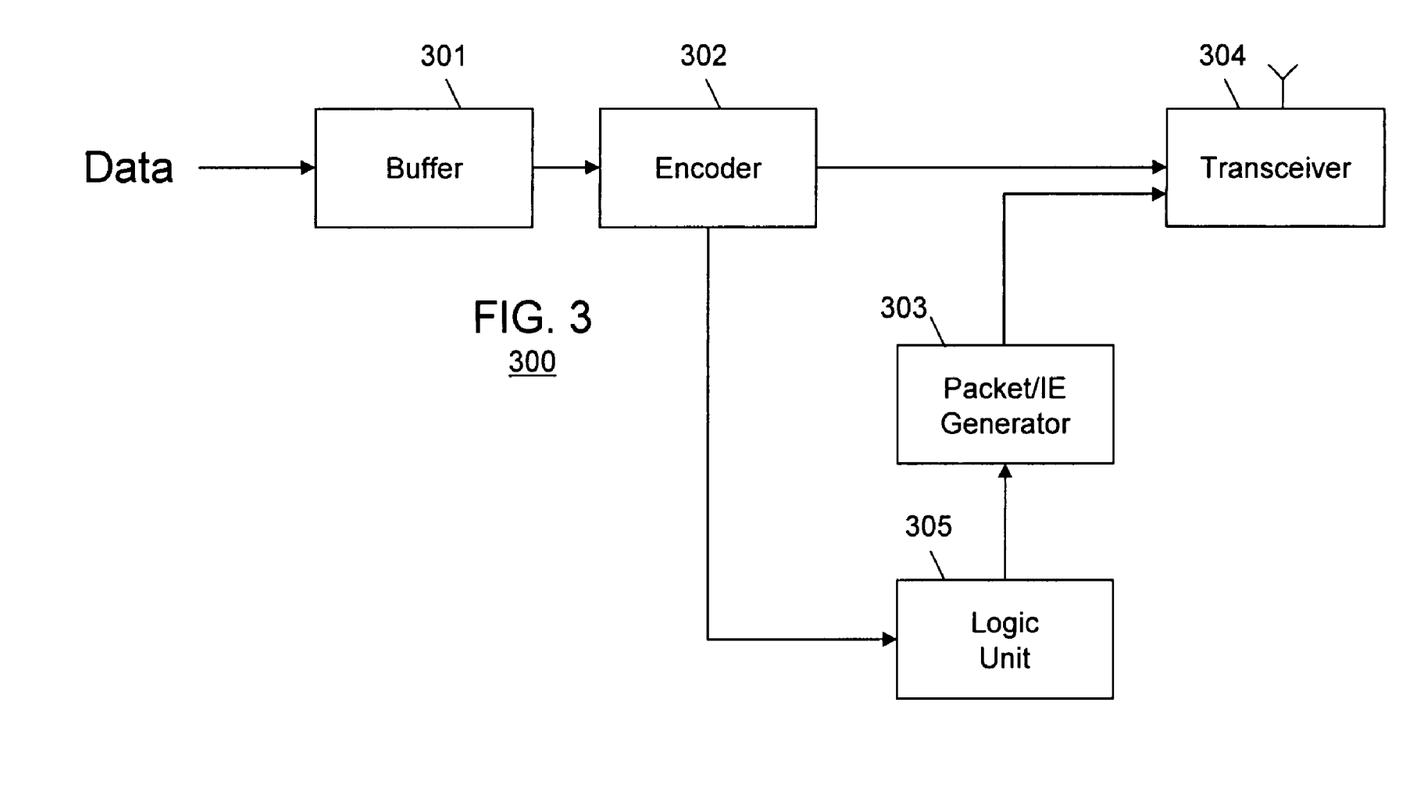
FIG. 3 is a block diagram of a transmitter.

FIG. 3 is a block diagram of transmitter 300 in accordance with the preferred embodiment of the present invention. As shown, transmitter 300 comprises buffer 301, encoder 302, packet/IE generator 303, transceiver 304, and logic unit 305. Buffer 301 comprises a storage means such as random-access memory for storage of data that is to be transmitted to a receiver. Encoder 302 is capable of encoding the buffered data via one of several encoding schemes (e.g., CC, BTC, LDPC, CTC or CTC IR sub-packets). H-ARQ operates at the FEC block level. Encoder 302 is responsible for generating the H-ARQ packets or for IR the sub-packets, as defined in the relevant section of the IEEE 802.16 system protocol. The packets or sub-packets ate combined by a receiver FEC decoder as part of the decoding process. Packet/IE generator comprises circuitry that constructs data packets or IEs to be transmitted to the receiver. Finally, logic circuitry 305 comprises a microprocessor controller such as a Freescale PowerPC microprocessor, available from Freescale, Inc. Among other things, logic unit 305 analyzes the current encoding scheme and determines DL-MAP Type, DL-MAP Sub-Type, Length, and H-ARQ mode based on the type of encoding being used by the encoder. The values for DL-MAP Type, DL-MAP Sub-Type, Length, and H-ARQ mode are provided to packet/IE generator 303 for construction of Switch-Mode IE message 200. The H-ARQ mode being utilized is based on the type of encoding.

Figure 4:
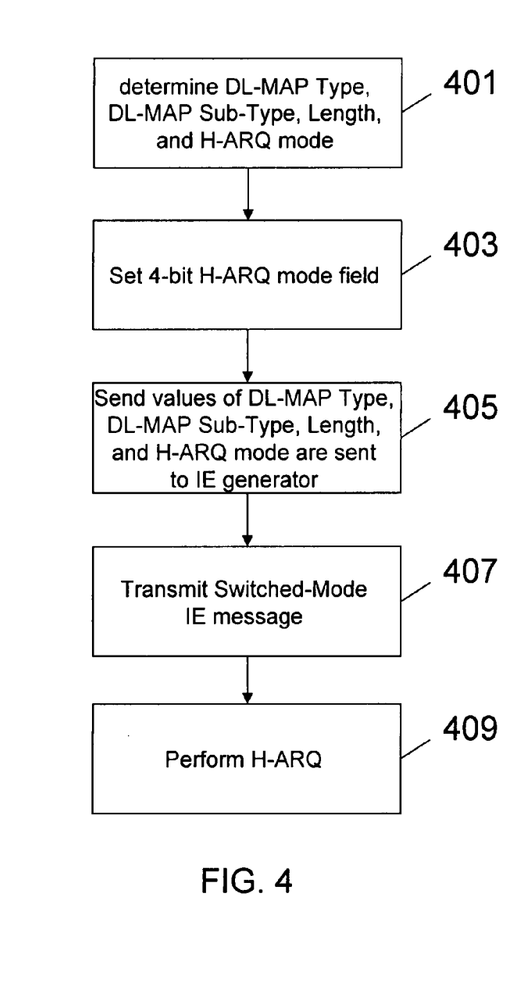
FIG. 4 is a flow chart showing operation of the transmitter of FIG. 3.

FIG. 4 is a flow chart showing operation of transmitter 300. Particularly, FIG. 4 shows those steps necessary to identify the H-ARQ scheme being utilized by the transmitter. The logic flow begins at step 401 where logic unit 305 determines DL-MAP Type, DL-MAP Sub-Type, Length, and H-ARQ mode. As discussed above, H-ARQ mode is determined via analyzing encoder 302 to determine the encoding scheme (generic Chase combining or Incremental Redundancy) being utilized. If CTC IR is being utilized, then the 4-bit H-ARQ mode field is set to zero, and if Chase combining is being utilized, then the 4-bit H-ARQ mode field is set to one (step 403). Other H-ARQ codes may be supported by adding additional code points. This is illustrated in Table 2.

TABLE 2

HARQ-mode field values

| H-ARQ Mode | Description |
|---|---|
| 0 | CTC Incremental Redundancy |
| 1 | Generic Chase |
| 2 . . . 15 | Reserved |

At step 405 the values of DL-MAP Type, DL-MAP Sub-Type, Length, and H-ARQ mode are sent to IE generator 303 where Switch-mode IE message 200 is generated. At step 407 Switch-mode IE message 200 is transmitted to a receiver and at step 409 H-ARQ takes place utilizing the H-ARQ mode. In the preferred embodiment of the present invention the IE message comprises an IEEE 802.16 switch-mode IE containing the H-ARQ mode. Communication then takes place with the receiver by sending and/or receiving H-ARQ packets using the H-ARQ mode.

Figure 5:
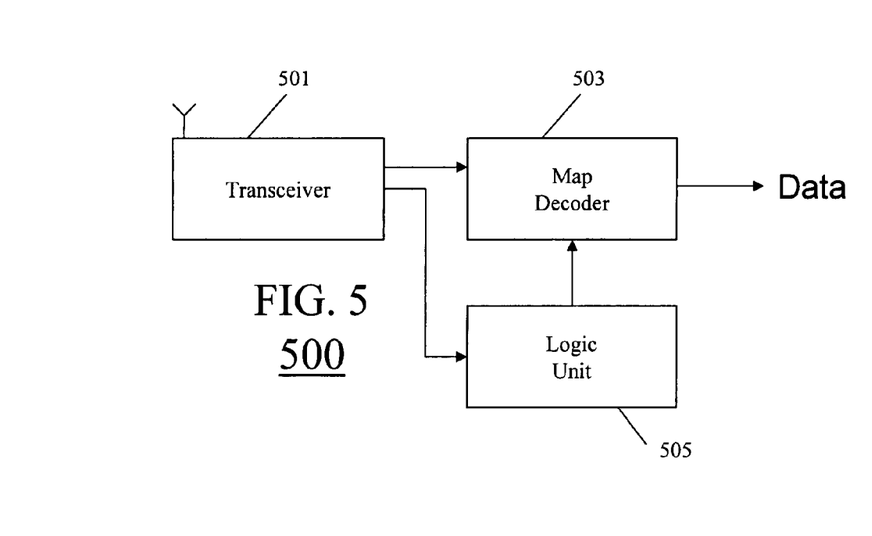
FIG. 5 is a block diagram of a receiver.
Figure 6:
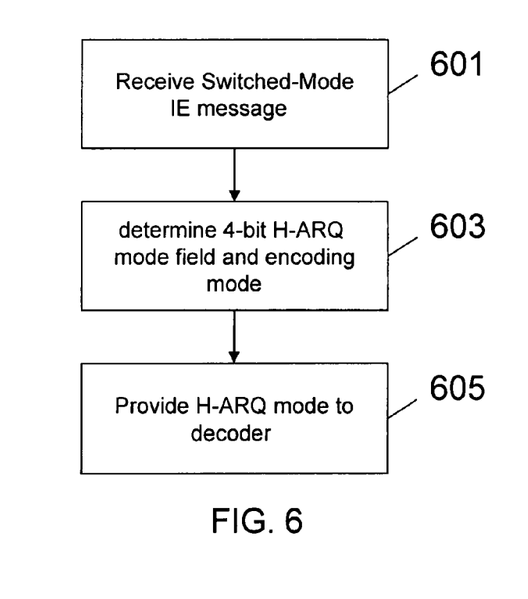
FIG. 6 is a flow chart showing operation of the receiver of FIG. 5.

FIG. 5 is a block diagram of receiver (SS) 500. As shown, SS 500 comprises transmitter/receiver combination (transceiver) 501, decoder 503, and logic circuitry 505. Transceiver 501 comprises a standard IEEE 802.16 transmitter and receiver, while decoder 503 preferably comprises a LDPC decoder. Logic circuitry 505 is preferably a microprocessor controller such as a PowerPC, available from Freescale, Inc. Receiver 501 will receive an over-the-air message comprising the H-ARQ mode, with decoder 503 performing a type of H-ARQ based on the message. Thus, decoder 503 will attempt to decode the received packet on a first H-ARQ attempt. If the decoding succeeds, SS 500 will send an ACK to the transmitter via transceiver 501. If the decoding fails, SS 500 will send a NAK to the BS. In response, the transmitter will send another H-ARQ attempt. The transmitter may continue to send H-ARQ attempts until SS 500 successfully decodes the packet and sends an acknowledgement. As discussed above, in order for H-ARQ to be successfully employed, the H-ARQ mode must be known by receiver 500. With this in mind, FIG. 6 is a flow chart showing the steps necessary for receiver 500 to successfully perform H-ARQ.

The logic flow begins at step 601 where Switch-mode IE message 200 is received over the air by transceiver 501. At step 603 the 4-bit H-ARQ mode field is determined from Switch-mode IE message 200 and the encoding mode (i.e., H-ARQ mode) is determined by logic unit 505. The H-ARQ mode is provided to decoder 503 at step 605, where decoding of incoming packets takes place. In particular, a first H-ARQ mode is utilized when IR coding takes place, while a second H-ARQ mode is utilized when Chase combining takes place. Thus, H-ARQ is performed, with the type of H-ARQ being based on the received switch-mode IE message.

It should be noted that the IEEE 802.16 Sub-packet Identifier (SPID), encoder packet size (Nep) and the number of sub channels (Nsch) found in the H-ARQ MAP IE will need to be redefined when using Chase combining. More particularly, the SPID is unique to incremental redundancy H-ARQ modes to identify the particular sub-packet having a unique redundancy pattern. H-ARQ modes based on Chase combining do not have unique sub-packets and therefore do not require a sub-packet identifier. The Nep and Nsch together are control information that define a quantized set of information block size and resource allocation pairs for the CTC IR mode. This pairing implicitly defines the number of information bits per symbol and with a suitable constraint can implicitly map to the modulation and coding rate. Although, these Nep and Nsch pairs may be appropriate for CTC IR, they are not appropriate for all FEC modes. For example, in some cases it might be more appropriate to have a finer granularity on the resource allocation. Therefore it may be more appropriate to assign resources as an independent specification of the modulation and coding rate (MPR) and the resource allocation. Redefining the Nep and Nsch based on the H-ARQ mode allows for the maximum flexibility.

In order to allow Chase combining, alternative definitions for these three parameters are provided for use only when Chase combining is utilized. Because the message size of the IEEE 802.16 Section 6.3.2.43 HARQ-MAP message must remain constant, the alternative definitions for SPID (2 bits), Nep (4 bits), and Nsch (4 bits) must have the same number of total bits (i.e., 10) as the original definitions.

The two-bit SPID is used by IEEE 802.16 to identify which incremental redundancy encoding format is being used to transmit the current packet. For Chase H-ARQ, all retransmission are identical to the first transmission, therefore, the SPID field is unneeded. When Chase H-ARQ is used, the SPID field is marked as reserved and encoded "00".

The Nep and Nsch are each 4-bit fields in the H-ARQ signaling defined in 802.16RevD/D5. These 4-bit fields define the modulation, the number of information bits and number of sub-channels assigned. For the Convolutional Turbo Code (CTC) mode, the number of information bits is defined by value of Nep as indexed in table 330 on page 613 of 802.16RevD/D5. The number of subchannels assigned is dependent on both Nep and Nsch and is addressed for the downlink in Table 329 on page 609 of 802.16RevD/D5. Finally, the modulation is determined by calculating the Modulation Product Rate (MPR) as defined on page 608 of 802.16RevD/D5 and then making a comparison with a set of threshold levels. Alternatively, the modulation, coding rate and number of sub channels assigned may be represented in a 16×16 table of Nep and Nsch values.

As discussed, Chase combining requires alternate definitions of Nep and Nsch. In the preferred embodiment of the present invention the 8 bits used for Nep and Nsch are redefined as two fields: a shortened DIUC/UIUC field of 3 bits and a companded sub channel allocation of 5 bits. These values are only used when a generic Chase HARQ allocation is signaled (i.e., H-ARQ mode=1 in the Switch-mode IE). The shortened DIUC field is 3-bits, which is 1-bit smaller the DIUC field in the conventional DL_MAP (i.e., when IR is utilized). The shortened DIUC is mapped to the lower eight values in the conventional DIUC. The companded sub channel allocation would identify the number of sub channels based on a pre-defined look-up table, as illustrated in Table 3. In this example, the assigned subchannels are defined in a uniform logarithmic manner.

For the values in Table 3 a base-2 logarithmic operation is applied and then a uniform number of values are quantized between the (linear) assigned subchannel values that are an integer number of powers of 2. This can be seen in that there are the same number (i.e., 3) of assigned subchannel entries between 128 and 256, 256 and 512, etc. The companding is not a purely a uniform quantization after a logarithmic operation in order to better match/multiplex withitn the 32 subchannels in an OFDMA symbol/baud. However, other companding operations, such as a pure uniform quantization after a logarithm operation, may also be applied. For example, three values of between 256 and 512 subchannels may be selected as 304, 362, 431 subchannels, corresponding to 2 to the power 8.25, 8.5, and 8.75.

TABLE 3

Companded Subchannels when Chase Combining is utilized

| Companded Sub Channels | Assigned Sub Channels |
|---|---|
| 0 | 1 |
| 1 | 2 |
| 2 | 3 |
| 3 | 4 |
| 4 | 5 |
| 5 | 6 |
| 6 | 7 |
| 7 | 8 |
| 8 | 10 |
| 9 | 12 |
| 10 | 14 |
| 11 | 16 |
| 12 | 20 |
| 13 | 24 |
| 14 | 28 |
| 15 | 32 |
| 16 | 40 |
| 17 | 48 |
| 18 | 56 |
| 19 | 64 |
| 20 | 80 |
| 21 | 96 |
| 22 | 112 |
| 23 | 128 |
| 24 | 160 |
| 25 | 192 |
| 26 | 224 |
| 27 | 256 |
| 28 | 320 |
| 29 | 384 |
| 30 | 448 |
| 31 | 512 |

As is evident, because 5 bits are utilized by the companded subchannel (instead of the usual 9), certain subchannel assignments are skipped in order to obtain the maximum allowable subchannel assignments (e.g., 512). Additionally, when non-HARQ allocations are sent, the DIUC comprises 4 bits signaling 13 different burst profiles less the 3 special pre-defined indications for peak-to-average reduction zones, end of the downlink map or an extended DIUC address space. These latter three special encodings are unnecessary for H-ARQ encoding, therefore, therefore using a shortened DIUC of 3-bits only reduces the available burst profiles to 9 from the original 13 values. The 9 burst profiles enabled by the shortened DIUC is sufficient for effective adaptive modulation and coding operation.

The method for randomizing the data must be modified to accommodate the Chase combining. Currently, the PRBS generator is seeded based on the starting OFDM symbol number and subchannel number. This can result in a different randomization pattern for each HARQ attempt making them impossible to combine. To remedy this problem, it proposed that the PRBS be seeded with the cell ID as is done for the CTC IR.

With the new fields for Nep and Nsch existing when Chase combining is utilized, sections 6.3.2.3.43.6.1, 6.3.2.3.43.6.2, and 6.3.2.3.43.6.3, have the table entries for Nep and Nsch:

| $N_{EP}$ code | 4 bits | Code of encoder packet bits (see 8.4.9.2.3.5) |
| $N_{SCH}$ code | 4 bits | Code of allocated subchannels (see 8.4.9.2.3.5) |

Replaced with:

```
if (H-ARQ mode = "CTCIR") {
    N_EP code        4 bits Code of encoder packet bits (see
                            8.4.9.2.3.5)
    N_SCH code       4 bits Code of allocated subchannels (see
                            8.4.9.2.3.5)
} elsif (H-ARQ mode = Generic) {
    Shortened DIUC   3 bits Shortened DIUC
    Companded SC     5 bits Code of allocated subchannels
                            (see 8.4.9.5)
}
```

Thus, all transmitters employing the IEEE 802.16 system protocol will need to determine an encoding type (as discussed above), and transmit the Sub-packet Identifier (SPID) field, the encoder packet size (Nep) field, and the number of sub channels (Nsch) field. However, the control information broadcast within these fields will be based on the encoding type (e.g., Chase combining or Incremental Redundancy) being utilized by the encoder. More particularly, standard 802.16 SPID, Nep, and Nsch fields are utilized when Incremental Redundancy is used with alternative definitions for these three parameters being utilized only when Chase combining is used.

Figure 7:
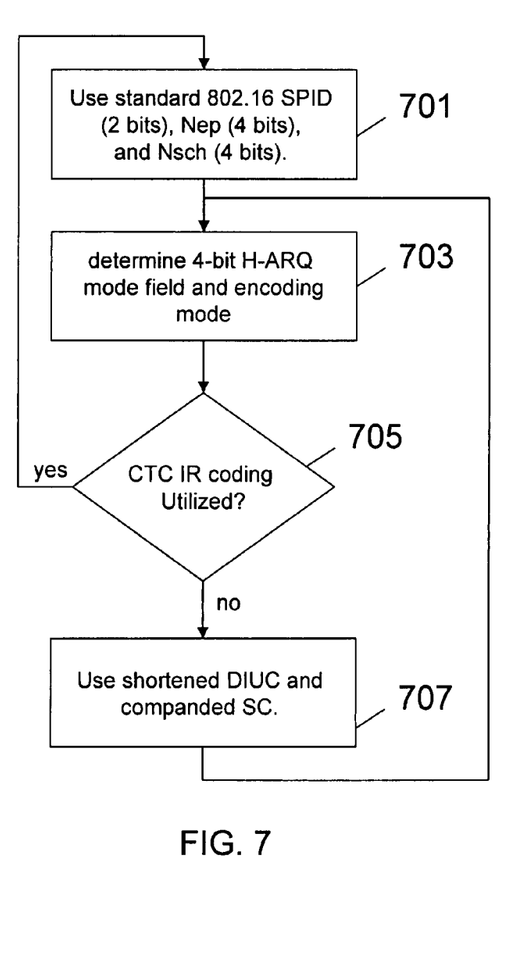
FIG. 7 is a flow chart showing operation of the receiver of FIG. 5.

FIG. 7 is a flow chart showing operation of the receiver of FIG. 5, and in particular, the transmission of control information. The logic flow begins at step 701 where the default 802.16 SPID (2 bits), Nep (4 bits), and Nsch (4 bits) fields are being utilized by logic circuitry 505 for IR. It should be noted that these fields are utilized as the default settings for receiver 500. At step 703 an IE message is received and logic unit 505 analyzes an incoming 4-bit H-ARQ mode field from the Switch-mode IE message 200. At step 705 a determination is made by logic circuitry 505 as to whether CTC IR coding is utilized. If, at step 705 it is determined that standard CTC IR coding is utilized, then the logic flow returns to step 701 where the 10 bits included in any received HARQ-MAP IE are used by logic circuitry 505 as 802.16 SPID (2 bits), Nep (4 bits), and Nsch (4 bits). However, if at step 705 logic circuitry 505 determines that the Generic Chase coding is utilized, then the logic flow continues to step 707 where the SPID field is unneeded and the Shortened DIUC and companded SC are utilized. The logic flow returns to step 703. Thus, logic circuitry determines an encoding type and utilizes the plurality of fields in the IE for a first information type when a first type of encoding is utilized and utilizes the plurality of fields in the IE for a second information type when a second encoding type is utilized Particularly, a first channel allocation table to be utilized when IR is being used, and a second channel allocation table to be utilized when Generic Chase combining is used. Additionally, when Generic Chase combining is used, the shortened DIUC is mapped to the lower eight values in the conventional DIUC. Thus, the plurality of fields in the switch-mode IE are utilized for first information when a first type of encoding is utilized and utilizing the plurality of fields for second information when a second encoding type is utilized.

Figure 8:
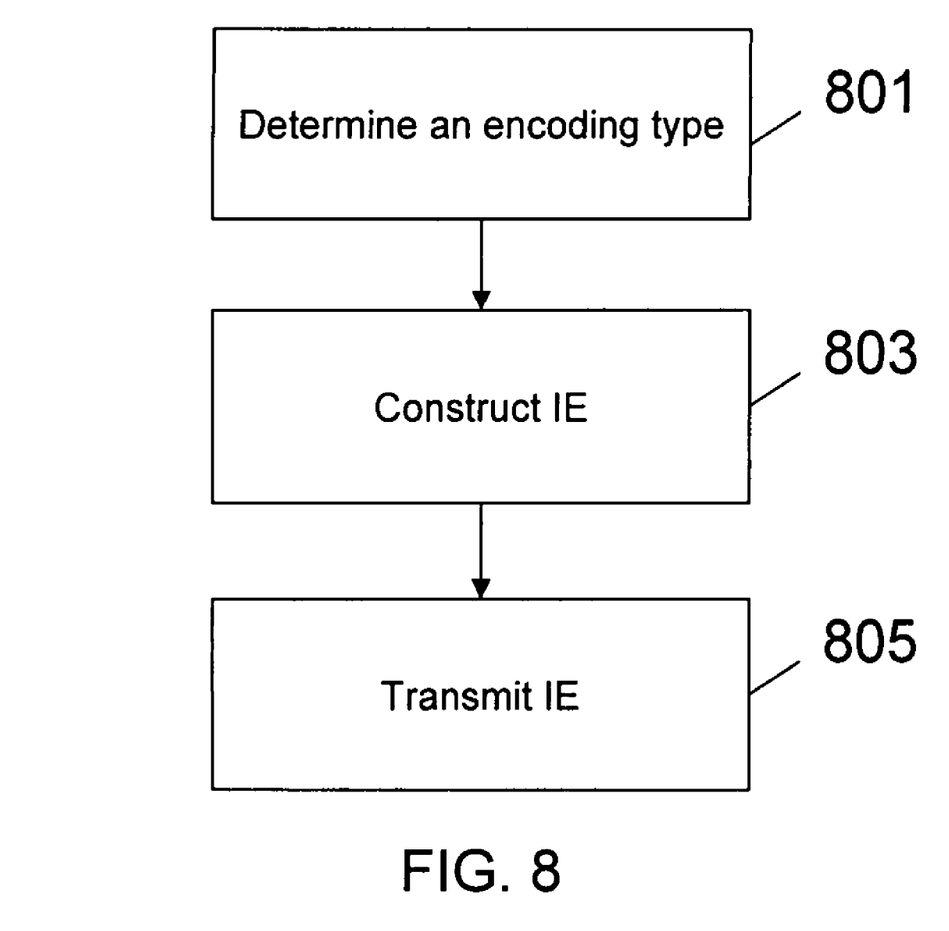
FIG. 8 is a flow chart showing operation of the transmitter of FIG. 3.

FIG. 8 is a flow chart showing operation of the transmitter of FIG. 3. The logic flow begins at step 801 where data is received by encoder 302. The data received by encoder 302 is to be transmitter to a receiver. At step 803 logic unit 305 determines an encoding type being utilized by encoder 302. This step entails determining the encoding type for the data to be transmitted to the receiver, and specifically comprises the step of determining if generic Chase combining or Incremental Redundancy is being utilized.

At step 805 logic unit 305 then instructs packet/IE generator 303 to construct IEs with a Sub-packet Identifier (SPID) field, an encoder packet size (Nep) field, and a number of sub channels (Nsch) field, wherein the information transmitted within these fields is based on the encoding type. In particular, 802.16 SPID, Nep, and Nsch fields are utilized when CTC Incremental Redundancy is used, while a "00" is used for the SPID field and a shortened DIUC/UIUC field of 3 bits and a companded sub channel allocation of 5 bits is used when Chase combining is being utilized.

Finally, at step 807 the IE is transmitted, via transmitter 304. Data is also transmitted to the receiver, where the data is appropriately encoded by encoder 302. As is evident, the type of information in the Sub-packet Identifier (SPID) field, the encoder packet size (Nep) field, and the number of sub channels (Nsch) field based on the encoding type.

While the invention has been particularly shown and described with reference to a particular embodiment, it will be understood by those skilled in the art that various changes in form and details may be made therein without departing from the spirit and scope of the invention. For example, additional H-ARQ modes could be added to the specification to cover different types of error correcting coding schemes. Although, most foreseeable error correcting coding schemes can utilize the Generic Chase mode, it is possible to define new incremental redundancy modes can be incorporated into the H-ARQ protocol using the switch-mode IE These new incremental redundancy modes could use alternate methods for encoding the number of assigned subchannels, modulation and coding rate. It is intended that such changes come within the scope of the following claims.

The invention claimed is:

1. A method for performing hybrid automatic repeat request (H-ARQ), the method comprising the steps of:

determining a DL-MAP Type, DL-MAP Sub-Type, Length, and an H-ARQ mode, wherein DL-MAP Type specifies a type of information element and DL-MAP Sub-Type specifies an extended map type as H-ARQ mode switch;

transmitting a message to a receiver indicating the DL-MAP Type, DL-MAP Sub-Type, Length, and the H-ARQ mode; and transmitting an H-ARQ packet using the H-ARQ mode.

2. The method of claim 1 wherein:

the step of transmitting the message comprises the step of transmitting the message as an 802.16 Information Element (IE), wherein the IE comprises the DL-MAP Type, DL-MAP Sub-Type, Length, and H-ARQ mode.

3. The method of claim 1 wherein the step of transmitting the message comprises the step of transmitting an IEEE 802.16 switch-mode information element (IE) containing the H-ARQ mode.

4. The method of claim 1 wherein the step of determining the H-ARQ mode being utilized comprises the step of determining the FEC coding modes and H-ARQ retransmission schemes supported by the receiver.

5. The method of claim 1 further comprising the step of:
determining an H-ARQ mode being utilized.

6. The method of claim 5 wherein the step of determining the H-ARQ mode being utilized comprises the step of determining the H-ARQ mode being utilized based on a generic Chase combining or Incremental Redundancy encoding.

7. The method of claim 1 wherein the H-ARQ mode being utilized is based on Chase Combining or Incremental Redundancy.

8. An apparatus comprising:

an encoder encoding data;

logic circuitry determining a type of H-ARQ based on a type of encoding being used by the encoder; and a transmitter transmitting a message over the air to a receiver indicating the type of H-ARQ, wherein the message comprises a DL-MAP Type, a DL-MAP Sub-Type, a Length, and the type of H-ARQ, wherein DL-MAP Type specifies a type of information element and DL-MAP Sub-Type specifies an extended map type as H-ARQ mode switch.

9. The apparatus of claim 8 wherein the type of encoding being utilized comprises generic Chase combining or Incremental Redundancy.

10. The apparatus of claim 8 wherein the message comprises an IEEE 802.16 switch-mode information element (IE) containing the H-ARQ mode.

* * * * *